United States Patent
Bhimani et al.

(10) Patent No.: US 10,282,324 B2
(45) Date of Patent: May 7, 2019

(54) SMART I/O STREAM DETECTION BASED ON MULTIPLE ATTRIBUTES

(71) Applicant: Samsung Electronics Co., Ltd., Suwon-si, Gyeonggi-do (KR)

(72) Inventors: Janki S. Bhimani, Billerica, MA (US); Jingpei Yang, Santa Clara, CA (US); Changho Choi, San Jose, CA (US); Jianjian Huo, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 15/344,422

(22) Filed: Nov. 4, 2016

(65) Prior Publication Data

US 2017/0075832 A1 Mar. 16, 2017

Related U.S. Application Data

(63) Continuation-in-part of application No. 15/144,588, filed on May 2, 2016.

(60) Provisional application No. 62/192,045, filed on Jul. 13, 2015, provisional application No. 62/245,100, (Continued)

(51) Int. Cl.
*G06F 12/00* (2006.01)
*G06F 13/18* (2006.01)
*G06F 12/02* (2006.01)
*G06F 17/30* (2006.01)
(Continued)

(52) U.S. Cl.
CPC ............ *G06F 13/18* (2013.01); *G06F 3/0611* (2013.01); *G06F 3/0647* (2013.01); *G06F 3/0653* (2013.01); *G06F 3/0688* (2013.01);
*G06F 12/0246* (2013.01); *G06F 17/30353* (2013.01); *G06N 3/00* (2013.01); *G06F 2212/1016* (2013.01); *G06F 2212/1036* (2013.01); *G06F 2212/7201* (2013.01); *G06F 2212/7202* (2013.01); *G06F 2212/7205* (2013.01)

(58) Field of Classification Search
CPC ................. G06F 13/18; G06F 12/0246; G06F 17/30353; G06F 3/0611; G06F 3/0647; G06F 3/0653; G06F 3/0688; G06F 2212/7201; G06F 2212/1016; G06F 2212/1036; G06F 2212/7202; G06F 2212/7205; G06N 3/00
See application file for complete search history.

(56) References Cited

U.S. PATENT DOCUMENTS

| | | |
|---|---|---|
| 5,930,497 A | 7/1999 | Cherian et al. |
| 2004/0098541 A1 | 5/2004 | Megiddo et al. |
| 2006/0287973 A1 | 12/2006 | Kageyama |

(Continued)

FOREIGN PATENT DOCUMENTS

EP    2884396 A1    6/2015

*Primary Examiner* — Kalpit Parikh
(74) *Attorney, Agent, or Firm* — Lewis Roca Rothgerber Christie LLP (57) ABSTRACT

A multi-streaming memory system includes a memory, and a processor coupled to the memory, the processor executing a software component that is configured to identify multiple attributes that are each related to logical block addresses (LBAs), and that each correspond to each of a plurality of streams of data writes, evaluate an importance factor for each of the attributes for each of the streams, and clustering two or more of the LBAs by assigning a stream ID to each of the LBAs based on all of the importance factors for each of the LBAs and the assigned stream.

20 Claims, 2 Drawing Sheets

Related U.S. Application Data filed on Oct. 22, 2015, provisional application No. 62/383,302, filed on Sep. 2, 2016.

(51) Int. Cl.
*G06F 3/06* (2006.01)
*G06N 3/00* (2006.01)

(56) References Cited

U.S. PATENT DOCUMENTS

| | | |
|---|---|---|
| 2007/0226443 A1 | 9/2007 | Giampaolo |
| 2008/0071970 A1 | 3/2008 | Lin |
| 2008/0183918 A1 | 7/2008 | Dhokia et al. |
| 2008/0263259 A1* | 10/2008 | Sadovsky ............ G06F 3/0613 711/100 |
| 2009/0024808 A1 | 1/2009 | Hillier, III et al. |
| 2010/0017487 A1* | 1/2010 | Patinkin ............... G06Q 10/107 709/206 |
| 2012/0131304 A1* | 5/2012 | Franceschini ....... G06F 12/0246 711/202 |
| 2012/0239869 A1* | 9/2012 | Chiueh ............... G06F 12/0246 711/103 |
| 2013/0013889 A1 | 1/2013 | Devaraj et al. |
| 2013/0262533 A1 | 10/2013 | Mitra et al. |
| 2014/0089545 A1 | 3/2014 | Samanta et al. |
| 2015/0169449 A1* | 6/2015 | Barrell ............... G06F 12/0862 711/143 |
| 2015/0324300 A1 | 11/2015 | Sampathkumar et al. |
| 2016/0042005 A1 | 2/2016 | Liu et al. |
| 2016/0139927 A1 | 5/2016 | Gschwind et al. |
| 2016/0266792 A1 | 9/2016 | Amaki et al. |
| 2016/0283116 A1* | 9/2016 | Ramalingam ......... G06F 3/0602 |
| 2016/0283125 A1 | 9/2016 | Hashimoto et al. |
| 2016/0313943 A1 | 10/2016 | Hashimoto et al. |

\* cited by examiner

SMART I/O STREAM DETECTION BASED ON MULTIPLE ATTRIBUTES

CROSS-REFERENCE TO RELATED APPLICATION(S)

This application claims priority to and the benefit of U.S. Provisional Application No. 62/383,302, filed Sep. 2, 2016, and is a continuation-in-part application of U.S. application Ser. No. 15/144,588, filed May 2, 2016, which is related to U.S. application Ser. No. 15/090,799, filed Apr. 5, 2016, of which both applications claim priority to and the benefit of U.S. provisional U.S. Application Ser. No. 62/192,045, filed Jul. 13, 2015, and provisional U.S. Application Ser. No. 62/245,100, filed Oct. 22, 2015, all of which are incorporated herein by reference.

FIELD

One or more aspects of embodiments according to the present invention relate to methods and mechanisms for improving stream assignment in multi-streaming flash drives.

BACKGROUND

A solid-state drive/solid-state disk (SSD) is a solid-state storage device that uses integrated circuit (IC) assemblies as memory to persistently store data. SSD technology typically utilizes electronic interfaces that are compatible with traditional block input/output (I/O) hard disk drives (HDDs), thereby providing easy replacement in many common applications.

Write amplification describes an issue corresponding to some forms of non-volatile memory, such as NAND flash memory, which are used in solid state drives (SSDs). Write amplification may be described as a ratio of a number of writes committed to non-volatile memory at an SSD to a number of writes coming from a host computing platform. Write amplification may cause issues for random writes to SSDs. For example, high write amplification may reduce write performance for the SSD, and may increase wear on non-volatile memory cells, thereby degrading endurance of the memory device.

A concept referred to as "multi-stream SSD" provides operating systems and applications with interfaces that separately store data with different attributes. These individual data stores are referred to as "streams." Streams may be used to indicate when different data writes are associated with one another or have a similar lifetime. That is, a group of individual data writes may be a part of a collective stream, and each stream is identified by a stream ID that is assigned by the operating system or a corresponding application. Accordingly, different data having similar characteristics, or attributes, can be assigned a unique stream ID such that data corresponding to that stream ID can be written to a same block in the SSD.

That is, multi-streaming flash drives enable more flexibility by placing write operations that are related to each other together on the SSDs, thereby both reducing write amplification and increasing the performance of SSDs. For example, efficient stream assignment in multi-streaming flash drives can reduce write amplification, and can improve both the lifetime and the endurance of SSDs.

Currently, stream assignment generally occurs at the application layer by modifying the application performing the data writes, which may not be suitable for systems with multiple instances of different applications due to resultant high maintenance overhead. Moreover, if multiple applications are supported by multiple storage devices at the backend, then the associated overhead will be further increased.

Additionally, in most of the current multi-streaming systems, only a small number of attributes are used for automatic stream detection (i.e., the attributes of frequency and temporal locality of access of a particular entity), thereby limiting an analytical method for detecting streams.

SUMMARY

Aspects of embodiments of the present disclosure are directed toward multi-streaming flash drives, and toward reducing write amplification and increasing performance of SSDs.

According to an embodiment of the present invention, there is provided a multi-streaming memory system including a memory, and a processor coupled to the memory, the processor executing a software component that is configured to identify multiple attributes that are each related to logical block addresses (LBAs), and that each correspond to each of a plurality of streams of data writes, evaluate an importance factor for each of the attributes for each of the streams, and clustering two or more of the LBAs by assigning a stream ID to each of the LBAs based on all of the importance factors for each of the LBAs and the assigned stream.

The software component may be further configured to assign a weight factor to one or more of the attributes, and the software component may be configured to assign the stream ID to each of the LBAs by giving priority to the importance factors corresponding to the multiple attributes over others of the importance factors based on the assigned weight factor.

The software component may be configured to evaluate the importance factor for each of the attributes for each of the LBAs by generating an n×m feature matrix including n×m addresses, wherein n is a total number of the attributes and m is a total number of LBAs.

Each of the addresses of the feature matrix may correspond to the importance factor, and includes a single-bit binary value indicating whether a corresponding attribute of a corresponding one of the LBAs is important.

The software component may be further configured to determine a value of the single-bit binary value based on whether a threshold corresponding to the attribute is met.

The software component may be further configured to assign a same stream ID to ones of the LBAs having matching binary values in corresponding ones of the addresses of the feature matrix.

The software component may be configured to evaluate the importance factor for a congruency attribute as one of the attributes for each of the LBAs by determining which group of streams of the streams correspond to concurrent data write requests occurring during each of multiple timestamp windows.

The software component may be configured to evaluate the importance factor for the congruency attribute by representing the LBAs of each of the streams of the group of streams in an element in a queue for each of the timestamp windows, comparing each element, when the queue is filled, with all other elements, and identifying the LBAs of the streams of the group of streams that are each represented in each of a plurality of the elements.

The software component may be further configured to generate a dictionary for assigning a stream ID to future LBA requests based on the importance factor for each of the attributes for each of the LBA requests, and the memory may be configured to store the dictionary.

According to another embodiment of the present invention, there is provided a method of identifying attributes that are each related to a logical block address (LBA) corresponding to an input/output (I/O) stream of data in a multi-streaming memory device, the method including detecting the input/output (I/O) stream corresponding to the memory device, capturing a plurality of attributes corresponding to the LBA corresponding to the detected I/O stream, generating a feature matrix for indicating an importance factor of each of the attributes for the LBA, and clustering received data into different streams based on the feature matrix.

The method may further include generating an analytical model based on the feature matrix for evaluating aspects of the clustering of the received data into different streams.

The method may further include introducing a relative weight factor to the analytical model to differently weight the captured attributes based on a level of importance of each of the attribute.

The method may further include generating a dictionary based on the analytical model for assigning a corresponding stream ID to a subsequently received stream by performing a lookup.

Clustering the received data into different streams may include assigning a corresponding stream ID to the LBA.

The plurality of attributes may include frequency, temporal locality, sequentiality, or congruency.

Each address of the feature matrix may include a single-bit for indicating the importance factor corresponding to the attribute corresponding to the LBA.

Clustering the received data into different streams may include determining which logical block addresses (LBAs) correspond to the received data.

Clustering the received data into different streams may include determining which LBAs are concurrently accessed during each of a plurality of timestamp windows.

According to another embodiment of the present invention, there is provided a method of assigning an importance factor of a congruency attribute to a stream of data in a multi-streaming memory device, the method including receiving streams of data respectively corresponding to logical block addresses (LBAs), determining whether a number of unique LBAs accessed in each of a plurality of timestamp windows is less than a threshold, inserting symbols respectively corresponding to the timestamp windows and respectively representing the LBAs into a queue when the number of unique LBAs corresponding thereto is not less than the threshold, determining whether the queue is full with the inserted symbols, and determining which of the LBAs are concurrently accessed during each of multiple ones of the timestamp windows when the queue is full.

The method may further include assigning a same stream ID to the streams corresponding to the LBAs that are determined to have been concurrently accessed during each of the multiple ones of the timestamp windows.

BRIEF DESCRIPTION OF THE DRAWINGS

These and other aspects of the present invention will be appreciated and understood with reference to the specification, claims, and appended drawings, wherein:

DETAILED DESCRIPTION

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As discussed above, efficient stream assignment in multi-streaming flash drives can reduce write amplification, and can improve the lifetime, endurance, and performance of SSDs. Streams of data may be more efficiently assigned by identifying and capturing appropriate attributes for deciding a corresponding stream ID, and by efficiently aggregating the benefit acquired from each different attribute.

Also as discussed above, many existing multi-streaming systems consider very few attributes (e.g., frequency and temporal locality of accesses) of a particular entity for the purpose of automatic stream detection. The low performance improvements by current automatic stream detection algorithms indicates that new attributes of the identified streams may be suitable to reflect the expected life of data to be stored in the multiple streams of SSDs.

Accordingly, embodiments of the present invention provide a new model to capture and incorporate multiple attributes with a multi-streaming memory device, to improve stream ID assignment to I/O requests under the application layer (e.g., device driver, file system, etc.), and to packetize the I/O request traffic into multiple streams. Unlike conventional technologies, the described embodiments provide a higher number of attributes considered for stream assignment, while providing a scalable method that is able to combine various attributes, and the described embodiments are therefore able to better leverage the advantages of multi-streaming SSDs. That is, the described embodiments are able to develop an analytical model for smart stream assignment with improved multi-threaded K-means clustering while considering multiple attributes. The described embodiments also enable design of a low/minimum overhead training phase technique to capture multiple attributes from an I/O trace, and also provide a novel attribute referred to as "congruency" to thereby account for the effect of congruency in efficient stream detection and identification.

Figure 1:
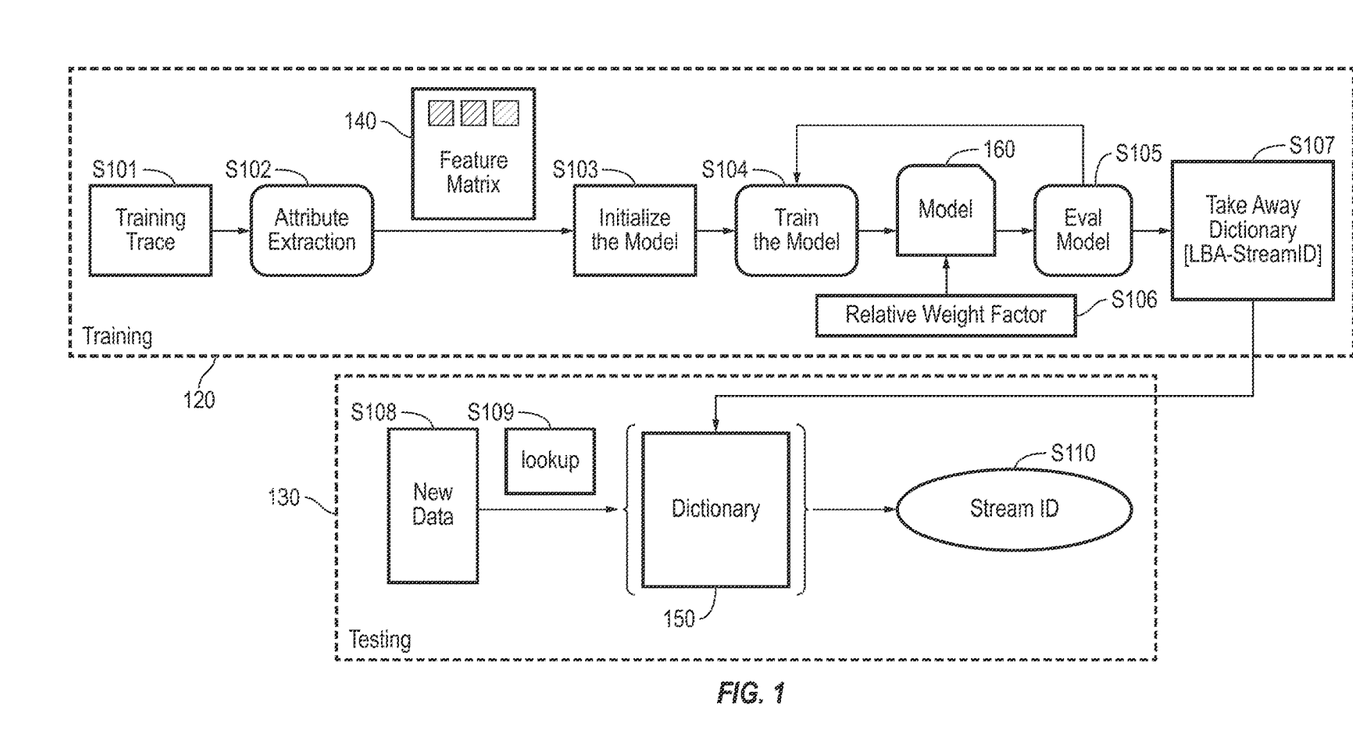
FIG. 1 is a block diagram depicting an analytical model for smart stream assignment with improved multi-threaded K-means clustering for considering multiple attributes, according to an embodiment of the present invention.

The embodiments described below with respect to FIG. 1 are able to provide improved automated stream assignment that is able to consider multiple attributes, such as frequency, temporal locality, sequentiality, and the novel attribute of "congruency," which is described in detail with reference to FIGS. 2 and 3.

FIG. 1 is a block diagram depicting an analytical model for smart stream assignment with improved multi-threaded K-means clustering for considering multiple attributes, according to an embodiment of the present invention. Although the present embodiment is described as being deployed at a device driver layer, and although the referenced entity of concern is the logical block address (LBA) corresponding to incoming data, in other embodiments, the entity of concern may differ depending on a deployment layer of the described embodiments for stream assignment. For example, the entity of concern may instead be the file for embodiments that are deployed at the file system layer.

Referring to FIG. 1, the analytical model of the present embodiment is described as including two phases, the two phases including a training phase 120 and a testing phase 130. At S101, in the training phase 120, an application platform may perform a training trace to capture one or more suitable attributes corresponding to detected I/O streams to the SSD. These captured attributes may include, for example, frequency, temporal locality, sequentiality, and/or congruency. These attributes captured from the training trace during S101 will be described in further detail below.

Thereafter, at S102, the captured attributes may be used to extract features to thereby generate a feature matrix 140, which is used to identify each of the extracted features for each of the detected I/O streams, and to indicate a level of importance for each of the features.

The feature matrix 140 may effectively indicate the importance (e.g., an importance factor) of each extracted attribute as it corresponds to each logical block address (LBA) or group of logical block addresses (LBAs). Accordingly, the feature matrix 140 may be thought of as an n×m matrix having n×m entries, where n is a total number of attributes analyzed for stream detection and identification, and where m is a total number of logical block addresses (LBAs).

The importance factor may be listed as data quanta stored in rows of the feature matrix 140. Each entry in the feature matrix 140 may be represented by a single binary bit that indicates whether the attribute is considered to be important for that particular logical block address (LBA). For example, each address in the feature matrix 140 may include either a "1" to indicate that the attribute is important for that logical block address (LBA), or a "0" to indicate that the attribute is not important for that logical block address (LBA). That is, to capture the various attributes (e.g., frequency, temporal locality, sequentiality, and congruency) with relatively low overhead, each attribute may be represented with a single-bit binary value for each LBA, although it should be noted that a multiple-bit value could be used to indicate a level of importance (e.g., varying degrees of importance) for each LBA. The binary value for a LBA entry is either 0 when the attribute of the feature matrix 140 are less than or not equal to the corresponding element in a threshold vector, or 1 otherwise. The threshold vector may be thought of as an n×1 matrix having n×1 entries, where n is total number of attributes and each entry in this matrix corresponds to threshold of each attribute. How each of the individual attributes may be captured will be described separately below.

The feature matrix 140 may be used for clustering, for example, data writes corresponding to the different logical block addresses (LBAs) into different streams. Accordingly, an improved multi-threaded K-means method may be used as the clustering model for clustering, or grouping, data writes into different streams, with K-means being an iterative, unsupervised clustering application. Each of the captured attributes may make up one feature of the clustering of the data. That is, each of the captured attributes used to identify different types of data by their features may correspond to either one row or one column of the feature matrix 140.

Once the feature matrix 140 is created, then, at S103, an analytical model for detecting and identifying different I/O streams may be initialized. The initialized model represents the K-means clustering.

Accordingly, at S104, the initialized model is trained to generate a model 160 for evaluation, and thereafter, at S105, the model 160 is evaluated. The model 160 may effectively shape itself, or train by itself, by using a machine-learning or self-learning algorithm. This may allow the model 160 to effectively emphasize which attributes are more important than others in determining which stream IDs to assign the different LBAs.

A relative weight factor corresponding to each of the different attributes may be unity, by default. However, at S106, an optional relative weight factor may be introduced to the model 160. That is, although all of the captured attributes may be initially equally weighted, at S106, a relative weight factor matrix corresponding to the attributes may be tuned and delivered as an optional input to the generated model 160 to emphasize a relative importance of each attribute in deciding and assigning a corresponding stream ID. For example, if one of the extracted attributes has a relatively higher level of importance than others of the extracted attributes, then a higher weight factor can be assigned to that attribute by introducing a relative weight factor to the model 160, which may then be evaluated, or reevaluated, at S105 (e.g., to be adjusted to comply with user or system determined specifications).

At the end of the training phase 120, once clustering is performed for a relatively small number of iterations (e.g., four or five iterations) at S104, at S105, and optionally at S106, then, at S107, a dictionary 150 for expressing a relation of each of the LBAs (for example) to a corresponding stream ID may be formed such that stream IDs may be automatically assigned to new data based on the identified corresponding LBA. In other embodiments, the training phase 120 may be performed as an initial step of a method, and/or may be performed periodically during the testing phase 130 to adjust the dictionary to compensate for any workload changes. The dictionary 150 may be stored on disc in memory, and may be stored in, for example, the device layer, the block layer, or the application layer, such that the dictionary 150 may be used throughout a runtime of the testing phase 130.

Accordingly, during the testing phase 130, at S108, new data comes in to be written to memory with the running workload. Thereafter, at S109, a lookup may be performed using the dictionary 150. That is, as the new data comes in at S108, the LBA corresponding to the new data received at S108 may be identified, and, based on a lookup of the dictionary 150 that is created during the training phase 120, a stream ID may be assigned based on the LBA corresponding to the newly received data to thereby group related data.

Thereafter, at S110, a corresponding physical address may be assigned to a stream ID. That is, while running the workload, a quick lookup into the dictionary 150 is only required for stream ID assignment without any runtime instrumentation overhead. Accordingly, the testing phase 130 may occur relatively quickly with no extra overhead.

It should be noted that the analytical model described above can be deployed at any layer (e.g. file system, device driver, etc.), thereby eliminating any need for applications to be involved in the process of assigning stream IDs. Further, for each I/O operation, and depending upon the layer of implementation, the analytical model is aware of either logical block numbers or files that are requested to be written on the SSD, allowing the self-learning model to find trends in the access of such logical block numbers or files.

It should be further noted that the analytical model described above is flexible with respect to a number of total attributes that may be evaluated. Accordingly, the analytical model can be used to consider any number of attributes to determine any number of stream IDs. Thus the present invention is not limited to a particular number of attributes, or to a particular number of streams. For example, embodiments of the present invention may be able to support future technologies in the field, even if a number of streams supported by multi-stream flash drives changes.

Examples of methods for capturing various attributes, as performed by the training trace at S101, are described below.

The attribute of frequency may correspond to how often a particular address is sought to be accessed as a result of incoming data. To capture the attribute of frequency, when the number of accesses of any particular address is less than predefined threshold (e.g. 4 times), then the frequency attribute corresponding to that particular address may be assigned as 1, indicating importance, and may otherwise be assigned as 0.

The attribute of temporal locality may correspond to how recently a particular address was sought to be accessed. To capture the attribute of temporal locality, a maximum timestamp of the training trace may be determined, and the addresses that are accessed after a predefined threshold (e.g. a threshold of 50%) of the maximum timestamp may be marked as being recent by assigning a 1 to the temporal locality attribute, and by otherwise assigning the temporal locality attribute as 0.

The attribute of sequentiality may correspond to whether incoming data seeks to access particular addresses in sequential order. To capture the attribute of sequentiality, when a new I/O stream is received by a sequence detector, the sequence detector may look up the previous (or within a certain predefined window size, such as 16) LBA in a given trace. If a match is found, the sequentiality attribute may be assigned as 1, and may otherwise be assigned as 0.

Figure 2:
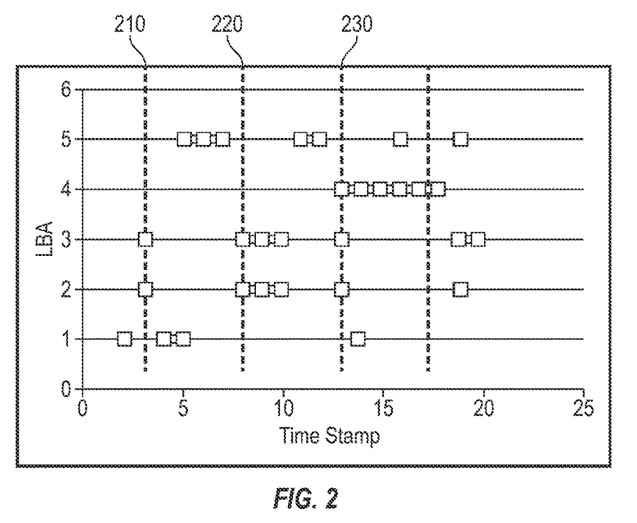
FIG. 2 is a sampling graph for describing a novel attribute of congruency, according to an embodiment of the present invention.

FIG. 2 is a sampling graph for describing a novel attribute of congruency, according to an embodiment of the present invention.

The attribute of congruency, which is an attribute introduced by embodiments of the present invention, corresponds to when different entities of concern, such as LBAs, are regularly updated at or about a same time. For example, when a particular group of addresses are updated often, or even always, at roughly the same time, then such a group of LBAs may be referred to as being congruent with each other. Because congruent addresses are accessed at the same time, it may be beneficial to group them together to improve performance of the memory device.

Referring to FIG. 2, the x-axis of the sampling graph corresponds to a timestamp (e.g., a timestamp window, or time interval), and the y-axis corresponds to the LBA space. In the present embodiment, congruency may be thought of as a quality of one or more LBAs being consistently timed with one or more other LBAs. Thus, if a particular group of LBAs are frequently updated at almost the same time, then that group of LBAs may be referred to as being congruent with each other. Accordingly, in the present example shown in FIG. 2, LBA2 and LBA3 are congruent with each other, as they are both concurrently updated at three of the four timestamp windows/time intervals indicated by the vertical dashed lines. To capture the attribute of congruency with low overhead, a fixed length queue may be maintained, where each element, or slot, of the queue represents an observed time interval/timestamp window.

In more detail, a device of an embodiment of the present invention may "snoop" between or at specific time intervals. In the example shown in FIG. 2, the instances of snooping are indicated by the vertical dashed lines. It can be seen that the LBA2 and the LBA3 are congruently updated at a first snoop time 210. Similarly, FIG. 2 shows that LBA2 and LBA3 are accessed at the same time at a second snoop time 220 and at a third snoop time 230. Because the different snoop times indicate that LBA2 and LBA3 have a tendency to be updated at the same time (e.g., are congruent), it may be beneficial to group LBA2 and LBA3 together into a single stream, as LBA2 and LBA3 may likely have similar life cycles.

Figure 3:
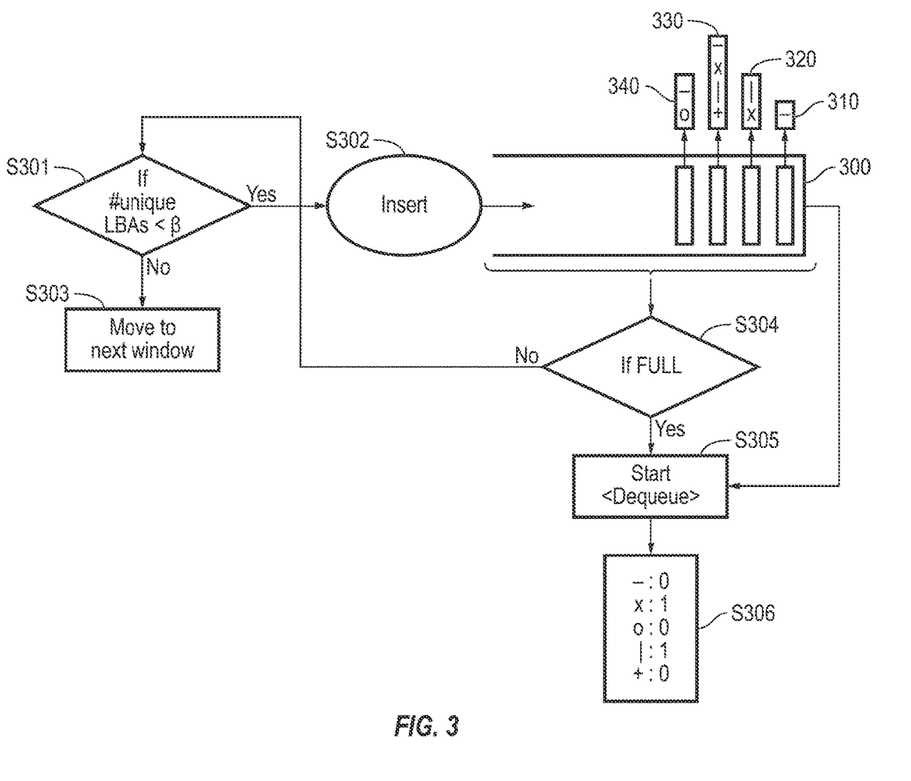
FIG. 3 is a congruency attribute assignment flowchart, according to an embodiment of the present invention.

FIG. 3 is a congruency attribute assignment flowchart, according to an embodiment of the present invention.

Referring to FIG. 3, which illustrates the flow chart of the process of deciding the congruency attribute by using the example of symbols [–, x, o, |, +] for indicating unique LBA addresses, in the process of capturing the attribute of congruency, there is a queue 300 including several elements, or slots, where each element of the queue 300 maintains a list of all of the unique LBAs accessed within that timestamp window that corresponds to the element (each element of the queue 300 referring to a single timestamp window).

At S301, it is determined whether a number of unique LBAs is less than a given threshold (e.g., threshold "β"). Each timestamp window will correspond to all of the LBAs accessed in that timestamp window, and the decision to insert a particular timestamp window into the queue 300 depends on a total number of unique LBAs accessed in that timestamp window, where the LBAs may be represented by various symbols. For example, in the present example, at the first timestamp window 310, the "–" LBA was accessed, at the second timestamp window 320, the "x" LBA and the "|" LBA were accessed together, at the third timestamp window 330, the "–" LBA, the "x" LBA, the "|" LBA, and the "+" LBA were accessed together, and in the fourth timestamp window 340, the "–" LBA and the "o" LBA were accessed together.

Logically, when few LBAs are accessed in a given timestamp window, but a combination of those few LBAs are congruent (i.e., they are accessed multiple times while also being accessed at the same time for a plurality of the multiple times), then the importance of grouping those LBAs into the same stream may be suitable. Thus, once the trace is obtained (e.g., as described with respect to FIG. 1), then an input may be analyzed.

If it is determined at S301 that the unique LBAs accessed within a timestamp window is less than the given threshold, then, at S302, the particular timestamp window is inserted into the queue 300. However, if it is determined at S301 that the unique LBAs accessed within a timestamp window is not smaller than the given threshold, then, at S303, the process moves on to a next timestamp window. Ignoring timestamp windows having a relatively large number of accessed LBAs may be beneficial, as the large number may indicate a lesser degree of importance with respect to congruency. Accordingly, by not importing into the queue 300 timestamp windows that have a relatively large number of addresses in it, computations may be performed more quickly, and the training phase 120 described with respect to FIG. 1 may be more efficient.

At S304, it is determined whether the queue 300 is full. Once the length of the queue 300 is filled, then, at S305, a dequeue is triggered by appending a value to a congruency attribute. The length of the queue 300 may be adjustable.

During the dequeue, each timestamp window is compared with all others to identify the congruent elements. When it is determined during the dequeue operation that a subset of values of the list of a first element of queue 300 matches with a subset of values of the list of another element of the queue 300, then those subsets of values are marked as 1 (e.g., congruent). If the subset of values of the list of an element do not match a subset of values of a list of any other element, then the subset of values corresponding to the element is marked as 0 (e.g., not congruent). A threshold of a size of the subset for purposes of determining congruency may be adjusted, and may be set as, for example, three values, such that the lists of two different elements having matching subsets containing only two matching values would still be marked as 0 (i.e., not congruent). At S305, the dequeue is operated in a first in, first out (FIFO) order.

At S306, a matrix (e.g., a congruency matrix) is created by assigning a single-bit binary value to each of the symbols representing the LBAs. Because the "x" LBA and the "|" LBA are both accessed at the second and third timestamp windows 320 and 330, and are accessed at no other timestamp window, the "x" LBA and the "|" LBA are both determined as congruent, and are assigned a value of "1," while the remaining LBAs are determined to be non-congruent, and are assigned a value of "0."

Furthermore, in other embodiments, there may be multiple sub attributes, such that there may be multiple columns in the congruency matrix of S306, and such that each row of the congruency matrix refers to data from different attributes.

Thereafter, once the congruency matrix is created at S306, the dictionary 150 generated during the training phase 120 of FIG. 2 is used as a lookup table for assigning stream IDs to the various streams of data.

Accordingly, embodiments of the present invention, as described above, may be implemented without the necessity of any application level changes, and therefore may be used for any application, workload, or platform used for running multiple applications simultaneously, while also enabling the use of multiple attributes. Furthermore, different attributes may be added, removed, or even tuned by using the appropriate relative weight factors discussed above, thereby enabling higher quality of stream id packetization.

Furthermore, because only a single hard lookup in the dictionary 150 is used during the testing phase 130, instrumentation overhead is low/minimal, thereby making the processes of the described embodiments faster during testing. Additionally, because the embodiments can be applied in different contexts, whereby something important is separated from something that is not important, the described embodiments may be applied in different fields, such as hot, warm, and cold data identification problems, multi-tiered storage, and efficient caching.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A multi-streaming memory system, comprising:
a memory; and
a processor coupled to the memory, the processor executing a software component that is configured to improve stream assignment in multi-streaming flash drives by:
identifying attributes that are each related to logical block addresses (LBAs), that each correspond to each of a plurality of streams of data writes, and that each are indicative of an expected lifespan of data to be stored in a corresponding stream;
determining which group of streams of the streams correspond to concurrent data write requests occurring during each of multiple timestamp windows to evaluate an importance factor for one of the attributes indicating how likely a group of LBAs will be accessed together as one of the attributes for each of the streams by:
representing the LBAs of each of the streams of the group of streams in an element in a queue for each of the timestamp windows;
comparing each element with all other elements; and
identifying the LBAs of the streams of the group of streams that are each represented in each of a plurality of the elements;
clustering two or more of the LBAs into one or more streams of data writes by assigning a single stream ID to each of the two or more clustered LBAs based on the importance factors for each of the LBAs and the assigned stream, and based on an indication that the expected lifespan of the data of the two or more of the LBAs will be similar; and
writing the data of the streams of data writes.

2. The system of claim 1, wherein the software component is further configured to assign a weight factor to one or more of the attributes, and
wherein the software component is configured to assign the stream ID to each of the LBAs by giving priority to the importance factors corresponding to the attributes over others of the importance factors based on the assigned weight factor.

3. The system of claim 1, wherein the software component is configured to evaluate the importance factor for each of the attributes for each of the LBAs by generating an n×m feature matrix comprising n×m addresses, wherein n is a total number of the attributes and m is a total number of LBAs.

4. The system of claim 3, wherein each of the addresses of the feature matrix corresponds to the importance factor, and comprises a single-bit binary value indicating whether a corresponding attribute of a corresponding one of the LBAs is important.

5. The system of claim 4, wherein the software component is further configured to determine a value of the single-bit binary value based on whether a threshold corresponding to a corresponding one of the attributes is met.

6. The system of claim 5, wherein the software component is further configured to assign a same stream ID to ones of the LBAs having matching binary values in corresponding ones of the addresses of the feature matrix.

7. The system of claim 1, wherein the software component is further configured to generate a dictionary for assigning a stream ID to future LBA requests based on the importance factor for each of the attributes for each of the LBA requests, and
wherein the memory is configured to store the dictionary.

8. The system of claim 1, wherein the attributes comprise an attribute of frequency, an attribute of temporal locality, an attribute of sequentiality, or an attribute of congruency, and wherein the importance factor for each of the attributes corresponds to whether a number of accesses of any particular address is less than a frequency attribute threshold, whether addresses are accessed after a temporal locality attribute threshold of a maximum timestamp of a training trace, whether a corresponding previous LBA has a matching sequence within a sequentiality attribute window size, or whether a number of unique LBAs accessed within a timestamp window is less than a congruency attribute threshold.

9. A method of identifying attributes that are each related to a logical block address (LBA) corresponding to an input/output (I/O) stream of data in a multi-streaming memory device to improve stream assignment in multi-streaming flash drives, the method comprising:
  detecting the input/output (I/O) stream corresponding to the memory device;
  capturing a plurality of attributes corresponding to the LBA corresponding to the detected I/O stream, and indicating an expected lifespan of data to be stored in the detected I/O stream;
  generating a feature matrix for indicating an importance factor of each of the attributes for the LBA;
  determining which group of streams of the streams correspond to concurrent data write requests occurring during each of multiple timestamp windows to evaluate the importance factor for one of the attributes indicating how likely a group of LBAs will be accessed together by:
    representing the LBAs of each of the streams of the group of streams in an element in a queue for each of the timestamp windows;
    comparing each element with all other elements; and
    identifying the LBAs of the streams of the group of streams that are each represented in each of a plurality of the elements;
  clustering received data corresponding to two or more LBAs into one or more different streams of data writes based on the feature matrix, and based on an indication that the expected lifespan of the data of the two or more of the LBAs will be similar; and
  writing the data of the streams of data writes.

10. The method of claim 9, further comprising generating an analytical model based on the feature matrix for evaluating aspects of the clustering of the received data into different streams.

11. The method of claim 10, further comprising introducing a relative weight factor to the analytical model to differently weight the captured attributes based on a level of importance of each of the attributes.

12. The method of claim 10, further comprising generating a dictionary based on the analytical model for assigning a corresponding stream ID to a subsequently received stream by performing a lookup.

13. The method of claim 9, wherein clustering the received data into different streams comprises assigning a corresponding stream ID to the LBA.

14. The method of claim 9, wherein the plurality of attributes comprise frequency, temporal locality, sequentiality, or congruency.

15. The method of claim 9, wherein each address of the feature matrix comprises a single-bit for indicating the importance factor corresponding to the attribute corresponding to the LBA.

16. The method of claim 9, wherein clustering the received data into different streams comprises determining which logical block addresses (LBAs) correspond to the received data.

17. The method of claim 16, wherein clustering the received data into different streams comprises determining which LBAs are concurrently accessed during each of a plurality of timestamp windows.

18. The method of claim 9, wherein the attributes comprise an attribute of frequency, an attribute of temporal locality, an attribute of sequentiality, or an attribute of congruency, and
  wherein the importance factor for each of the attributes corresponds to whether a number of accesses of any particular address is less than a frequency attribute threshold, whether addresses are accessed after a temporal locality attribute threshold of a maximum timestamp of a training trace, whether a corresponding previous LBA has a matching sequence within a sequentiality attribute window size, or whether a number of unique LBAs accessed within a timestamp window is less than a congruency attribute threshold.

19. A method of assigning an importance factor of an attribute to a stream of data in a multi-streaming memory device to improve stream assignment in multi-streaming flash drives, the method comprising:
  receiving streams of data respectively corresponding to logical block addresses (LBAs);
  determining whether a number of unique LBAs accessed in each of a plurality of timestamp windows is less than a threshold;
  inserting symbols respectively corresponding to the timestamp windows and respectively representing the LBAs into a queue when the number of unique LBAs corresponding thereto is not less than the threshold;
  determining whether the queue is full with the inserted symbols;
  determining which of the LBAs are concurrently accessed during each of multiple ones of the timestamp windows when the queue is full; and
  writing data of the streams of data.

20. The method of claim 19, further comprising assigning a same stream ID to the streams corresponding to the LBAs that are determined to have been concurrently accessed during each of the multiple ones of the timestamp windows.

* * * * *